United States Patent [19]
Richards et al.

[11] Patent Number: 6,058,709
[45] Date of Patent: May 9, 2000

[54] DYNAMICALLY BALANCED FUEL NOZZLE AND METHOD OF OPERATION

[75] Inventors: George A. Richards, Morgantown, W. Va.; Michael C. Janus, Baltimore, Md.; Edward H. Robey, Westover, W. Va.

[73] Assignee: The United States of America represented by the United States Department of Energy, Washington, D.C.

[21] Appl. No.: 08/991,630

[22] Filed: Nov. 6, 1997

Related U.S. Application Data

[60] Provisional application No. 60/030,759, Nov. 6, 1996.

[51] Int. Cl.[7] .................................................... F02C 7/22
[52] U.S. Cl. .............................. 60/725; 431/1; 431/114
[58] Field of Search .................................. 60/31.76, 725; 431/1, 114

[56] References Cited

U.S. PATENT DOCUMENTS

| | | | |
|---|---|---|---|
| 5,428,951 | 7/1995 | Wilson | 60/725 |
| 5,544,478 | 8/1996 | Shu | 60/725 |
| 5,809,769 | 9/1998 | Richards et al. | 60/725 |

*Primary Examiner*—Louis J. Casaregola
*Attorney, Agent, or Firm*—Bradley W. Smith; Mark P. Dvorscak; William R. Moser

[57] ABSTRACT

An apparatus and method of operation designed to reduce undesirably high pressure oscillations in lean premix combustion systems burning hydrocarbon fuels are provided. Natural combustion and nozzle acoustics are employed to generate multiple fuel pockets which, when burned in the combustor, counteract the oscillations caused by variations in heat release in the combustor. A hybrid of active and passive control techniques, the apparatus and method eliminate combustion oscillations over a wide operating range, without the use of moving parts or electronics.

6 Claims, 3 Drawing Sheets

DYNAMICALLY BALANCED FUEL NOZZLE AND METHOD OF OPERATION

This application claims the benefit of U.S. Provisional Application No. 60/030,759, filed on Nov. 6, 1996.

ORIGIN OF THE INVENTION

The United States Government has rights in this invention pursuant to the employer-employee relationship of the U.S. Department of Energy and the inventors.

BACKGROUND OF THE INVENTION

This invention encompasses control of combustion oscillations in lean premix (LPM) combustion systems, i.e., systems in which the volume of fuel present is less than the stoichiometric ratio with the air. More particularly, this invention relates to the apparatus and method for reducing undesirably high pressure oscillations in a LPM combustion chamber to acceptably lower levels by using natural combustion and nozzle acoustics to generate multiple fuel pockets which counteract the oscillations caused by variations in heat release. This apparatus and method of operation represent a hybrid of active and passive control technology and are capable of eliminating combustion oscillations over a wide combustor operating range. The apparatus requires no moving parts or electronic control systems, as do most active control techniques. Also, the apparatus and method of operation are applicable to any lean premix combustion system operating on any gaseous or liquid hydrocarbon fuel.

Combustion systems such as used in conjunction with gas turbines and steam-generators commonly use a hydrocarbon fuel with air in substantially stoichiometric ratios in an associated combustion chamber for the generation of sufficient heat energy for driving a turbine or for the generation of steam. However, the burning of hydrocarbon fuels in these systems produces environmental pollutants such as nitrogen oxides, which are tightly regulated. Efforts to reduce the production of these environmental pollutants include pre-mixing the fuel and air prior to introducing the mixture into the combustion chamber. Increasingly lean premixes, i.e., a mixture where the volume of fuel present is less than the stoichiometric ratio with the air, are used to avoid the high temperatures that produce thermal nitrogen oxides. A typical combustion system using a lean premix (LPM) is described in U.S. Pat. No. 5,372,008, which issued on Dec. 13, 1994, and which is incorporated herein by reference.

While LPM combustion has been successful in reducing the emissions of environmental pollutants, it is prone to combustion instability in the form of dynamic pressure oscillations. Pressure oscillations can occur when variations in heat release due to fuel feed variation periodically couple to acoustic modes in the combustion chamber. Oscillations can be thought of as a closed loop interaction between combustion and acoustic processes. A variation in heat release produces an acoustic disturbance that is reflected by the combustor walls, thus resulting in a pressure disturbance. Although the magnitude of this pressure disturbance is reduced by acoustic losses, it may produce some change in the combustion process, thereby altering the heat release, and closing the feedback loop. With the correct timing of the feedback, and sufficiently small losses, the oscillation magnitude can grow to a limit cycle or steady oscillation, meaning that the amplitude of the oscillations does not change.

As indicated by Rayleigh's criteria, "Theory of Sound," Volume II, No. 8, Dover, N.Y., 1945, the amplitude of the oscillations in the combustion chamber will be the strongest when the pressure wave is in-phase with the periodic heat release produced by the combustion of the fuel-air mixture. These dynamic pressure oscillations are frequently of a sufficiently high magnitude as to produce undesirable operating conditions including reducing the useful life of the combustion system components due to structural fatigue, vibrations and cycling fatigue.

Past research efforts have resulted in various passive and active control techniques designed to remove or reduce pressure oscillations. These efforts have achieved varying levels of success. Active control techniques typically involve the elimination of instabilities via the release of energy which is out of phase with the pressure oscillation. The disadvantage of active control schemes is that they generally involve complicated control equipment. Passive techniques typically increase acoustic losses or shift instability regions to a different part of the operating envelope via geometric alterations. The disadvantage of passive control schemes is that they may introduce efficiency losses (i.e., increased nozzle pressure drop), they may be reliable only at select conditions, or they may create new instability problems at different operating conditions.

A recent development found to satisfactorily suppress high-amplitude pressure oscillations in hydrocarbon-fueled combustion systems is described in applicant's copending patent application titled "Combustor Oscillating Pressure Stabilization and Method," Randall S. Gemmen, et al, Ser. No. 08/644,609, filed Apr. 26, 1996. In this copending patent application, the active control of unsteady combustion induced oscillations in a LPM combustion chamber is provided by restructuring and moving the position of the main flame front to increase the transport time and displace the pressure wave further out of phase with the periodic heat release. The restructuring and the repositioning of the main flame front are achieved by utilizing a pilot flame which is pulsed at a predetermined frequency corresponding to less than about one-half the frequency of the combustion oscillation frequency. The duration of each pilot-flame pulse is sufficient to produce adequate secondary thermal energy to restructure the main flame and thereby decouple the heat release from the acoustic coupling so as to lead to a reduction in the dynamic pressure oscillation amplitude. The pulsating pilot flame produces a relatively small and intermittent flame front in the combustion zone that is separate from the oscillating main flame front. This provides sufficient thermal energy to effectively reposition the oscillating main flame front from the region in the combustion zone where acoustic coupling can occur to a region of reduced coupling, thereby effectively altering the oscillation-causing phase relationship with the heat of combustion. This copending patent application is incorporated herein by reference.

Another recent development found to satisfactorily suppress high-amplitude pressure oscillations in hydrocarbon-fueled LPM combustion systems is described in applicant's copending patent application titled "Combustor Oscillation Attenuation Via the Control of Fuel-Supply Line Dynamics," George A. Richards and Randall S. Gemmen, Ser. No. 08/744,644, filed Nov. 6, 1996. In this application, the active control of unsteady combustion induced oscillations in a LPM combustion chamber is provided by utilizing an acoustically tunable fuel-delivery system for promoting a greater heat release in the combustion chamber during each low pressure segment of the pressure oscillations. Fuel-rich regions of combustible fuel and oxidizer mixtures are provided at the flame front of the combustion oscillation at a time when the pressure oscillation is at the lowest segment.

The burning of these fuel-rich regions produces a relatively large heat release at the pressure minima, thus resulting in significant attenuation of the pressure oscillations. Generally, the goal of this invention is achieved by acoustically tuning either the main fuel supply line or the pilot fuel supply line so that each pressure wave generated in the main combustion chamber creates an oscillation in the fuel contained in that supply line, thereby effectively creating a fuel-rich region at the supply line exit or fuel injection nozzle of the fuel-supply line that will be transported to and arrive at the flame front at a time when the pressure in the combustion chamber produced by oscillation is in a low, preferably the lowest, pressure phase. This tuning may be accomplished through the use of movable parts such as by forming a portion of the fuel-delivery line from two tubes, one placed inside the other with a section of the second tube being telescopically movable within the first tube so as to alter the length of the fuel-delivery line, thereby changing the phase of the oscillations in the fuel-delivery line. This copending patent application is incorporated herein by reference.

While active control techniques for reducing or suppressing undesirable pressure oscillations in LPM combustion systems fired with a suitable hydrocarbon fuel and oxidizer described above and in the publications referenced in applicant's aforementioned copending patent applications may satisfactorily reduce combustion oscillations, the primary objective or goal of the present invention is to combine active and passive control techniques to provide a further and improved apparatus and method for reducing combustion pressure oscillations in combustion chambers.

A further objective of the invention is to provide a simplistic approach to reducing pressure oscillations that requires no moving parts or electronics, unlike most active combustion control techniques. This is accomplished by using the natural combustor/nozzle acoustics in the combustion system to generate fuel pockets that counteract oscillations in heat release. As in an active control system, fuel pockets are deliberately generated to produce the stabilizing effect. In contrast to an active control system, however, the fuel pockets are not generated by mechanical means. Instead, the fuel system creates pockets via a dynamic response to the combustor pressure oscillations. With the correct distribution, these injected fuel pockets can stabilize an oscillation.

Other and further objectives of the present invention will become obvious upon an understanding of the illustrative embodiment and method about to be described or will be indicated in the appended claims, and various advantages not referred to herein will occur to one skilled in the art upon using the invention in practice.

SUMMARY OF THE INVENTION

Pressure oscillations occur in a LPM combustion chamber when the heat release due to combustion is in phase with the pressure oscillation. Such situations can arise from a variety of conditions. The present invention is intended to eliminate combustion oscillations over a wide operating range and for many types of combustion systems by balancing the fuel distribution throughout the combustor pressure cycle.

A typical fuel nozzle with fuel ports at a single axial location will respond to a combustor pressure fluctuation by delivering a single fuel "pocket" at a particular phase angle to the pressure maxima. The present invention consists of an apparatus and method of operation for reducing combustor pressure fluctuations by delivering multiple fuel "pockets" at different phase angles throughout the pressure cycle. This forced distribution of the fuel minimizes the interaction between the heat release and the acoustic pressure. Although one of the multiple fuel pockets may cause heat release at the pressure maxima, other fuel pockets exist which cause heat release at the pressure minima. The fuel pocket associated with the pressure minima dominates the process and consequently dampens the oscillation. By eliminating the single fuel pocket and creating multiple pockets, this invention also minimizes the percentage of fuel that could cause heat release at the pressure maxima via a fuel feed instability mechanism.

A preferred embodiment of the invention has been chosen for the purpose of illustration and description. The preferred embodiment illustrated is not intended to be exhaustive nor to limit the invention to the precise form shown. The preferred embodiment is chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As generally described above, the formation of undesirable combustion-induced oscillations in a combustion chamber fired by fuel in the presence of an oxidizer is a common problem in combustion systems operated in certain modes. These oscillations may be of such high pressure and amplitude as to substantially reduce the efficiency of the combustion system as well as significantly shorten the expected life of various combustion system components due to oscillation-induced vibrations and cyclic failures. These pressure oscillations are reinforced and thus are strongest when heat released by the combustion of the fuel-oxidizer mixture is in phase with the peak or highest pressure phase of each pressure wave. The oscillations propagate from the combustion chamber into the fuel-supply system. Oscillations in the fuel-supply system may contribute to the variations in the heat release, or may mitigate this variation depending on the phase of the oscillation when the fuel variations arrive at the flame front.

Figure 1:
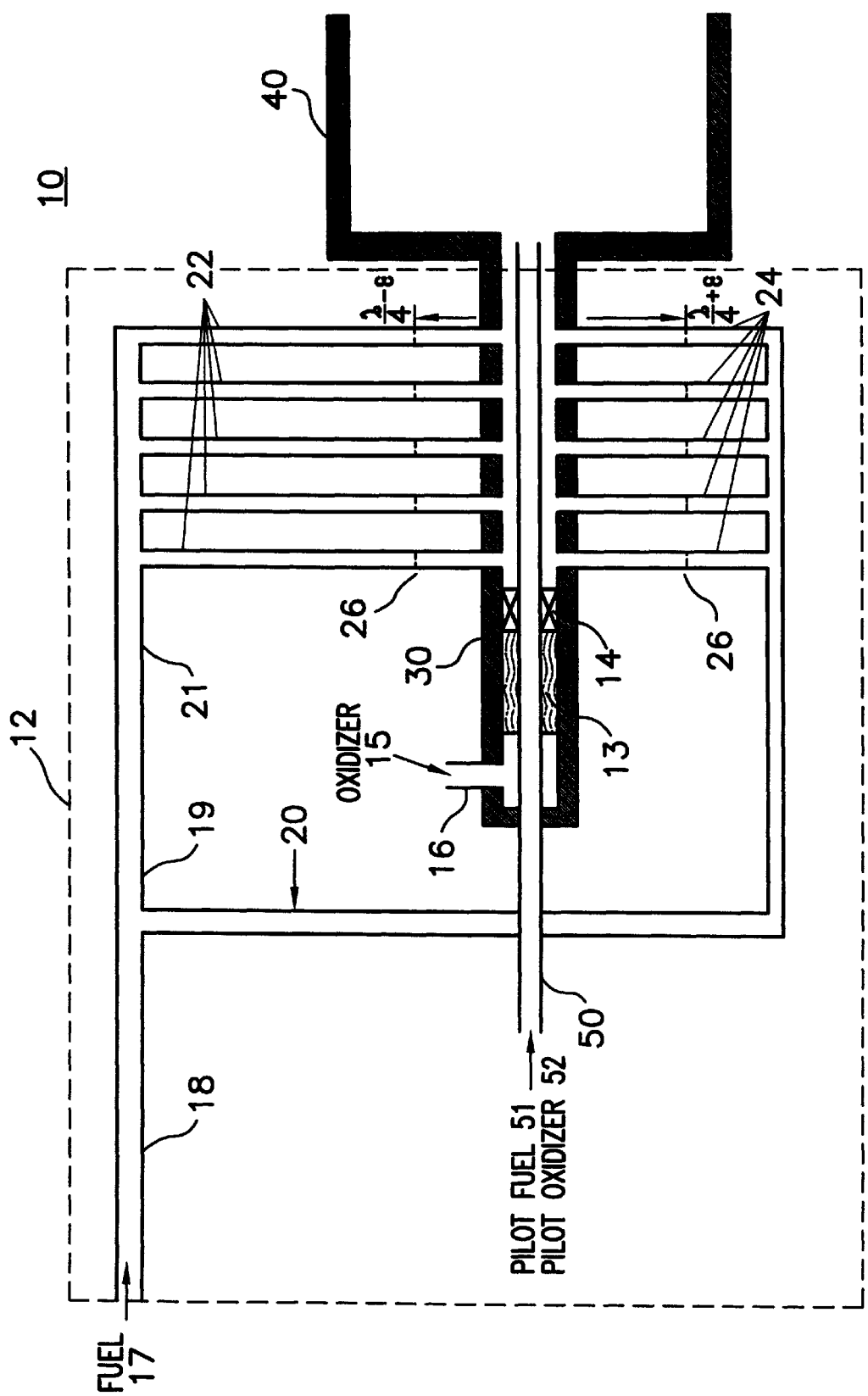
FIG. 1 is a schematic drawing of a combustion system nozzle arrangement.

FIG. 1 illustrates the improved nozzle 12 of this invention operating in a LPM combustion system 10 conventionally consisting of a combustion chamber 40 coupled to a cylindrical nozzle body 30. The nozzle body 30 is connected to an oxidizer supply (not shown) via an oxidizer delivery line or opening 16 and to a fuel supply (not shown) via a primary fuel delivery system 21, consisting of a primary fuel-supply line 18, a first fuel-delivery line 19, a second fuel-delivery line 20, a first set of fuel ports 22 and a second set of fuel ports 24. While the combustion chamber 40 illustrated in this drawing is limited in detail, the particular construction and operational details of the combustion chamber 40 are not critical since the present invention can be utilized in any system consisting of a fuel nozzle connected to any combustion chamber of essentially any configuration in which high-pressure oscillations are produced during the combustion process and wherein the nozzle can be acoustically tuned to create fuel fluctuations.

The nozzle body 30 contains a flow straightener 13 consisting of straight vanes, wire mesh or any other device that functions to keep the flow moving in a straight direction. The flow straightener 13 is optional but preferred. The nozzle body 30 also contains a set of swirl vanes 14, which can be either of an axial or radial design. A pilot tube 50 may optionally be provided.

As summarized above, the present invention reduces or eliminates high pressure oscillations in a LPM combustion chamber to lower levels by using natural combustion and nozzle acoustics to generate multiple fuel pockets that counteract the oscillations caused by variations in heat release. This is accomplished without moving parts or electronic controls, but rather, through exploitation of the dynamic response to the pressure oscillations over a wide combustor operating range. Thus, the primary fuel supply line 18 is connected to the fuel supply (not shown) and splits downstream of the fuel supply into a first fuel-delivery line 19 and a second fuel-delivery line 20, each of essentially equal cross-section. The first fuel-delivery line 19 and the second fuel-delivery line 20 each feed fuel to an equal number of fuel ports 22 and 24, the first set of fuel ports 22 located 180 degrees opposite the second set of fuel ports 24. The first fuel port 22 and the second fuel port 24 must be provided in pairs. There may be as few as one port 22 and one port 24 on each side of the nozzle body 30 or as many as can practically be located on the nozzle body 30 considering any space or operational limitations.

Each fuel port 22 and 24 has a choked orifice 26 designed to simulate the acoustic behavior of a quarter-wave tube. The choked orifice 26 consists essentially of a blockage in the ports 22 and 24 having a small opening such that high acoustic impedance to the frequencies of interest is provided. The distance of the choked orifice 26 from the nozzle body 30 in each of the first fuel ports 22 is the same, as is that of each of the second fuel ports 24. However, the distance of the orifices 26 from the nozzle body 30 in the first fuel port 22 at each axial location is different from that in the second fuel port 24 at that location, with the objective of accomplishing an acoustic design that provides fuel pockets with different phase angles. The orifice 26 on the first set of fuel ports 22 is positioned at a distance from the nozzle body 30 that is one quarter of the pressure oscillation wavelength minus some incremental distance ($\in$) and the orifice 26 on the second set of fuel ports 24 is positioned at a distance that is one quarter of the pressure oscillation wavelength ($\lambda$) plus the same increment distance ($\in$). The pressure oscillating wavelength ($\lambda$) is calculated by dividing the speed of sound by the frequency of the undesirable oscillations. This distance ($\in$) can be determined from experimental development tests and is typically 5 percent of $\lambda/4$. Because the distance of the orifices 26 from the nozzle body 30 are slightly longer (+$\in$) or slightly shorter (−$\in$) than $\lambda/4$, the phase of fuel pockets produced by each port either lead or lag the pressure wave in the nozzle body 30 by 90 degrees. Therefore, the first port 22 and the second port 24 positioned at each axial location are designed to be on opposite sides of resonance thus producing fuel pockets at phase angles which are 180 degrees apart.

The design and positioning of fuel ports 22 and 24 on the nozzle body 30 are critical. The fuel ports 22 and 24 should be designed such that distinct fuel pockets are created in each port 22 and 24 in response to the oscillating combustor pressure. This fluctuation is ensured by positioning the choked orifice 26 according to a distance related to the quarter wave length of the pressure oscillation, as previously described. The positioning of the fuel ports 22 and 24 is clearly dependent upon the oscillating frequencies experienced and the velocity of the mixture of fuel 17 and oxidizer 15 in the nozzle 12. Thus, the design of the nozzle 12 will be dependent upon the operating properties of the entire combustion system 10. For example, a combustion chamber 40 which experiences a 500 hertz (Hz) oscillation would require fuel pockets to periodically arrive over a 2 ms time span (the cycle time). If the velocity of the fuel 17 passing through the nozzle 12 is 50 meters per second (m/s), the nozzle body 30 would need ports 22 and 24 positioned over a 5 centimeter (cm) axial span. Although a pocket of fuel moving at 50 m/s for 2 milliseconds (ms) will travel 10 cm, the use of properly designed fuel ports 22 and 24 cuts the required distance in half.

Although the embodiment described above uses axially spaced opposing fuel ports 22 and 24 having choked orifices located at a distance from the nozzle body 30 related to the wavelength of the pressure oscillations in the combustion chamber 40, it would also be possible to make the fuel ports 22 and 24 acoustically active through other means. One example of such other means would be by using small Helmholz resonators. Alternately, the fuel ports 22 and 24 could be shortened to a length corresponding to the location of the choked orifices 26 in the above example and fed from a common manifold for the first ports 22 and a separate common manifold for the second ports 24. Additionally, any other resonant acoustic chamber could be used.

In operation, a stream of oxidizer 15 is sucked or pushed into the nozzle body 30 through an opening at the opposite end of the nozzle body 30 from the combustion chamber 40 and flows through the flow straightener 13 and then the set of swirl vanes 14. The oxidizer 15 is usually air but can be any other suitable combustion supporting medium, such as oxygen or oxygen-enriched air. The oxidizer 15 mixes with the fuel stream 17 before entering the combustion chamber 40. The fuel stream 17 can be any gaseous or liquid hydrocarbon. As a precaution to keep the flame in the combustion chamber 40 lit, a relatively small amount of pilot fuel 51 and pilot air 52 may optionally be provided to the pilot tube 50 at a ratio such that the amount of pilot air 52 provided is greater than that needed stoichiometrically to burn all of the pilot fuel 51.

The fuel stream 17 splits essentially equally between the first fuel delivery line 19 and the second fuel-delivery line 20. The fuel stream 17 in the first fuel-delivery line 19 splits essentially equally between the first set of fuel ports 22, and the fuel stream 17 in the second fuel-delivery line 20 likewise splits essentially equally between the second set of fuel ports 24.

The nozzle 12 responds to a pressure oscillation in the combustor 40 by delivering multiple fuel "pockets" through the fuel ports 22 and 24 at different phase angles throughout the pressure oscillation cycle. This distribution of the fuel 17 reduces the interaction between the heat release and the acoustic pressure. Although one of the multiple fuel pockets may cause heat release at the pressure maxima, other fuel pockets may cause heat release at the pressure minima. The fuel pocket associated with the minima dominates the process and consequently dampens the oscillation. By forming multiple fuel pockets, the nozzle 12 also minimizes the percentage of fuel which could cause heat release at the pressure maxima via a fuel feed instability mechanism.

Figure 2:
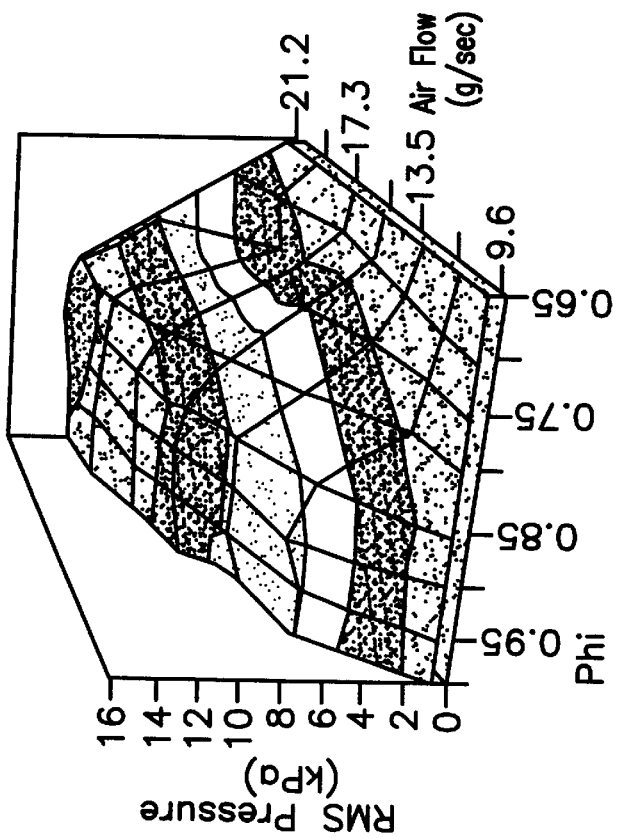
FIG. 2 is a stability map illustrating the amplitude of the pressure oscillations in root mean square (RMS) plotted against the air flow rate and the normalized fuel to air ratio as would occur in a combustion chamber using a typical gas turbine fuel nozzle in which all the fuel flows through a single port.

FIG. 2 is a stability map which shows the oscillation levels in a typical gas turbine fuel nozzle that does not utilize the nozzle 12 of the present invention and that does not use pilot fuel or pilot air to maintain combustion. In this case, all of the fuel 17 is mixed with the oxidizer 15 upstream and is delivered through a single fuel line. FIG. 2 indicates that a typical gas turbine fuel nozzle is highly unstable over a wide operating range.

Figure 3:
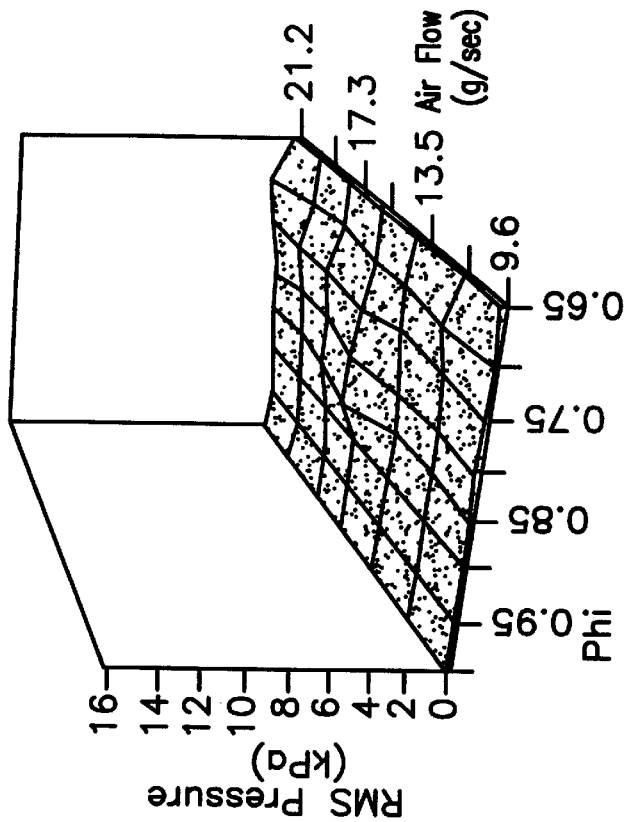
FIG. 3 is a stability map illustrating the amplitude of the pressure oscillations in root mean square (RMS) plotted against the air flow rate and the normalized fuel to air ratio as would occur in a combustion chamber such as shown in FIG. 1 in which all the fuel flows through a fuel nozzle that employs multiple dynamically balanced fuel ports in accordance with the present invention.

FIG. 3 shows oscillation levels when using the nozzle 12 of FIG. 1 with no pilot tube 50. In this case, all of the fuel 17 is delivered through the fuel ports 22 and 24 in roughly equal proportions. FIG. 3 indicates that the nozzle is essentially stable over the entire operating range.

Figure 4:
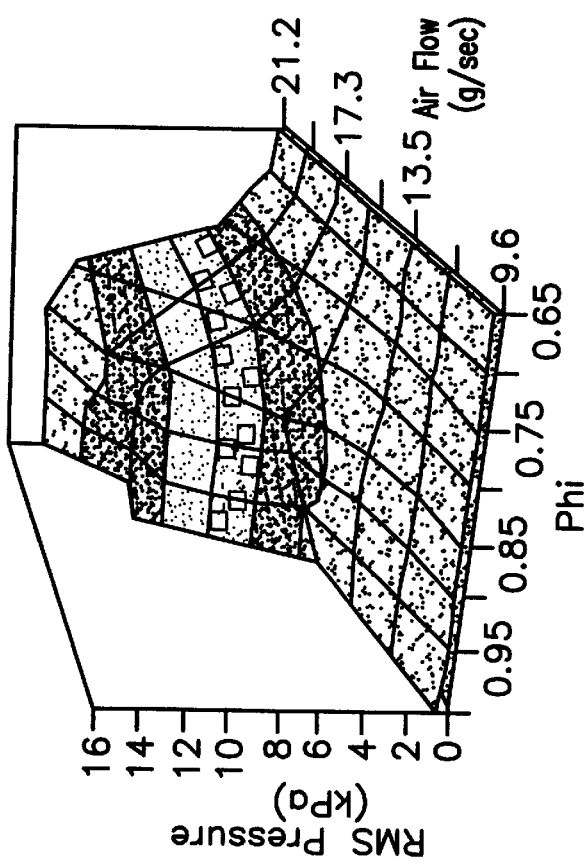
FIG. 4 is a stability map such as in FIG. 2 but with the addition of a constant flow of pilot fuel and air.

FIG. 4 shows oscillation levels in a typical gas turbine fuel nozzle (not the nozzle of this invention) that uses pilot fuel 51 and pilot air 52 to help maintain combustion. The figure indicates that this nozzle is still highly unstable over a wide operating range.

Figure 5:
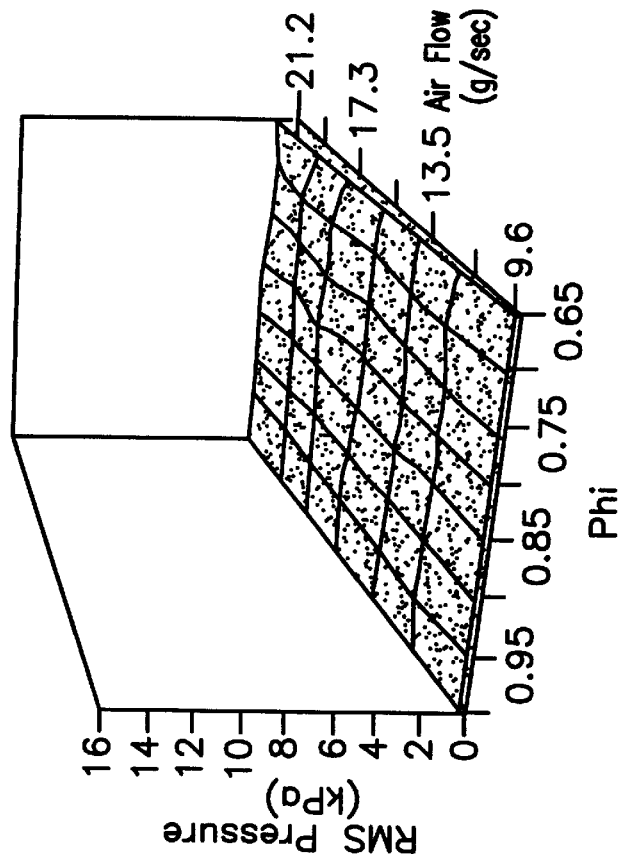
FIG. 5 is a stability map such as in FIG. 3 but with the addition of a constant flow of pilot fuel and air.

FIG. 5 shows oscillation levels when using the nozzle 12 of FIG. 1 with pilot fuel 51 and pilot air 52. In this case, a majority of the fuel 17 is delivered through the fuel ports 22 and 24 in roughly equal proportions, and a small amount of fuel 17 is delivered through the pilot tube 50. Once again, the nozzle 12 is essentially stable over the entire operating range.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

What is claimed is:

1. A dynamically balanced fuel nozzle for reducing the amplitude of pressure oscillations in a combustion system, comprising:

a nozzle body;

a primary fuel delivery means connected to said nozzle body that generates multiple fuel pockets through a dynamic response to the pressure oscillations to counteract said oscillations in the combustion system wherein said fuel delivery means comprises:

a primary fuel-supply line that splits downstream of the fuel source into a first fuel-delivery line and a second fuel delivery line;

the first fuel-delivery line is connected to a first fuel port located on the nozzle body;

the second fuel-delivery line is connected to a second fuel port located on the nozzle body at a position about 180 degrees radially opposite the first fuel port, wherein the first fuel port and second fuel port are present in a pair at about the same axial location on the nozzle body;

said first fuel port contains an orifice located at a distance away from the nozzle body such that a pocket of fuel is provided at a specific phase angle in response to the pressure oscillations in the combustion system; and said second fuel port contains an orifice located at a greater distance away from the nozzle body such that a pocket of fuel is provided at a phase angle about 180 degrees apart from that provided by the first fuel port;

an oxidizer delivery means connected to said nozzle body.

2. The dynamically balanced fuel nozzle of claim 1 wherein:

the distance between the nozzle body and the orifice associated with the first fuel port is one quarter of the wavelength ($\lambda$) of the pressure oscillation in the combustion system minus some incremental distance ($\epsilon$);

the distance between the nozzle body and the orifice associated with the second fuel port is one quarter of the wavelength ($\lambda$) of the pressure oscillation in the combustion system plus the same incremental distance ($\epsilon$);

the wavelength ($\lambda$) of the pressure oscillation is calculated by dividing the speed of sound by the frequency of the pressure oscillations; and the incremental distance ($\epsilon$) is a function of the wavelength ($\lambda$) of the pressure oscillation.

3. The dynamically balanced fuel nozzle of claim 2, wherein the incremental distance ($\in$) is approximately 5 percent of one quarter of the wavelength ($\lambda$) of the pressure oscillation in the combustion system.

4. The dynamically balanced fuel nozzle of claim 1 further comprising an pilot fuel and oxidizer delivery means to convey a minor portion of the fuel and oxidizer to be burned in the combustion system.

5. The dynamically balanced fuel nozzle of claim 1 further comprising an flow straightener in the nozzle body.

6. The dynamically balanced fuel nozzle of claim 1 further comprising swirl vanes in the nozzle body.

* * * * *